(12) United States Patent
Kubota et al.

(10) Patent No.: US 11,320,028 B2
(45) Date of Patent: May 3, 2022

(54) PRELOAD DETECTABLE SCREW DEVICE

(71) Applicant: THK CO., LTD., Tokyo (JP)

(72) Inventors: Yuji Kubota, Tokyo (JP); Hirofumi Suzuki, Tokyo (JP); Takamitsu Tomiyama, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/757,247

(22) PCT Filed: Oct. 12, 2018

(86) PCT No.: PCT/JP2018/038068
§ 371 (c)(1),
(2) Date: Apr. 17, 2020

(87) PCT Pub. No.: WO2019/078105
PCT Pub. Date: Apr. 25, 2019

(65) Prior Publication Data
US 2021/0190186 A1 Jun. 24, 2021

(30) Foreign Application Priority Data

Oct. 19, 2017 (JP) .............................. JP2017-202681
Oct. 19, 2017 (JP) .............................. JP2017-202682

(51) Int. Cl.
*F16H 25/22* (2006.01)
*F16H 25/24* (2006.01)
*F16H 25/20* (2006.01)

(52) U.S. Cl.
CPC ......... *F16H 25/2214* (2013.01); *F16H 25/24* (2013.01); *F16H 25/2006* (2013.01); *F16H 2025/2242* (2013.01)

(58) Field of Classification Search
CPC .. F16H 25/2214; F16H 25/24; F16H 25/2006; F16H 2025/2242; F16H 25/2209; G01B 7/31; G01B 21/22; G01B 21/32
See application file for complete search history.

(56) References Cited

U.S. PATENT DOCUMENTS 2,842,978 A * 7/1958 Orner .................. F16H 25/2204
74/424.86
5,263,381 A * 11/1993 Shirai ................. F16H 25/2209
74/441
(Continued)

FOREIGN PATENT DOCUMENTS

EP          0569595 A1    11/1993
JP         S63-187760 U    12/1988
(Continued)

OTHER PUBLICATIONS

International Search Report, dated Dec. 25, 2018, from corresponding PCT application No. PCT/JP2018/038068.

*Primary Examiner* — Zakaria Elahmadi
(74) *Attorney, Agent, or Firm* — Nixon & Vanderhye

(57) ABSTRACT

In a screw device where a shim is disposed between two nuts, a screw device that can detect preload is provided. The preload detectable screw device includes: two nuts; a shim sandwiched and compressed between the two nuts; a coupling portion configured to couple the two nuts in such a manner as to be incapable of relative rotation to each other; and a force sensor for detecting preload. A contact surface of at least one of the two nuts with the shim is provided with a recess, spaced apart from the coupling portion, in such a manner as to reduce the contact area. The force sensor is attached near the recess on an outer surface of the shim.

20 Claims, 19 Drawing Sheets

(56) References Cited

U.S. PATENT DOCUMENTS

| | | | | |
|---|---|---|---|---|
| 5,501,118 A * | 3/1996 | Benton | ............... | F16H 25/2209 470/2 |
| 5,644,951 A * | 7/1997 | Hatamura | ................ | B23Q 1/34 74/424.72 |
| 6,240,796 B1 * | 6/2001 | Yamada | ............... | B23Q 1/0063 74/89.23 |
| 6,698,301 B2 * | 3/2004 | Blaurock | ............ | F16H 25/2209 74/89.42 |
| 9,279,487 B1 * | 3/2016 | Guglietti | ............ | F16H 25/2209 |
| 9,464,703 B2 * | 10/2016 | Jeng | .................... | F16H 25/2204 |
| 10,088,034 B2 * | 10/2018 | Fang | ...................... | F16H 25/24 |
| 10,914,368 B2 * | 2/2021 | Chen | ........................ | G01L 5/0004 |
| 2002/0194783 A1 * | 12/2002 | Stojc | ....................... | F16H 25/24 49/118 |
| 2006/0248973 A1 * | 11/2006 | Teramachi | .......... | F16H 25/2247 74/424.83 |
| 2007/0028712 A1 * | 2/2007 | Teramachi | .......... | F16C 33/3706 74/424.82 |
| 2007/0137347 A1 * | 6/2007 | Teramachi | .......... | F16H 25/2247 74/424.86 |
| 2017/0023124 A1 * | 1/2017 | Minakuchi | .......... | F16H 57/0497 |
| 2017/0159778 A1 * | 6/2017 | Jeng | .................... | F16H 25/2006 |
| 2018/0187759 A1 * | 7/2018 | Smith | .................... | H02P 29/032 |
| 2019/0204064 A1 * | 7/2019 | Chen | ........................ | G01B 21/32 |

FOREIGN PATENT DOCUMENTS

| | | |
|---|---|---|
| JP | H02-221747 A | 9/1990 |
| JP | H05-138481 A | 6/1993 |
| JP | H05-138484 A | 6/1993 |
| JP | H05-141498 A | 6/1993 |
| JP | 2016-223493 A | 12/2016 |
| WO | 93/09911 A1 | 5/1993 |

* cited by examiner

PREVIOUSLY-KNOWN
EXAMPLE

INVENTION
EXAMPLE (1)

LARGE AMOUNT OF STRAIN

INVENTION
EXAMPLE (2)

PRELOAD DETECTABLE SCREW DEVICE

TECHNICAL FIELD

The present invention relates to a screw device that can detect preload, in which a shim for preloading is disposed between two nuts.

BACKGROUND ART

A screw device includes a screw shaft, a nut, and a plurality of rolling elements such as balls disposed between the screw shaft and the nut. When one of the screw shaft or the nut is rotated, the other performs linear motion. The screw device is used as a machine element that converts rotation into linear motion or converts linear motion into rotation. While the screw shaft rotates, the rolling element performs rolling motion. Accordingly, there are features that frictional resistance can be reduced and efficiency can be improved.

As a known screw device, a double nut screw device where a shim for preloading is disposed between two nuts is known. The shim is sandwiched and compressed between the two nuts. The two nuts are coupled by keys as coupling portions in such a manner as to be incapable of relative rotation to each other. The two nuts are coupled in such a manner as to be incapable of rotation; accordingly, it is possible to maintain a state where the shim is compressed by the two nuts. The two nuts are preloaded by reaction force from the shim in such a manner as to eliminate gaps in the axial direction. Preloading allows improvements in the rigidity and the positioning accuracy of the screw device.

Patent Literature 1 discloses, as a screw device that can detect preload, a screw device where end surfaces of two nuts in the axial direction are caused to face each other, the end surface of one of the two nuts is provided with a protrusion, and the end surface of the other nut is provided with a recess that accommodates the protrusion. A push screw presses the protrusion in the circumferential direction, and the phase about the axis of the one of the nuts is displaced from that of the other nut. Accordingly, preload is provided. A shim is not disposed between the two nuts, and a force sensor is sandwiched between the two nuts. The force sensor can detect axial preload acting on the two nuts.

CITATION LIST

Patent Literature

Patent Literature 1: JP 2016-223493 A

SUMMARY OF INVENTION

Technical Problem

When a screw device is used for a longtime, rolling elements, a screw shaft, and nuts wear out, and the preload provided to the two nuts decreases. Consequently, the positioning accuracy and the rigidity of the screw device decrease. If preload can be detected, the screw device can be replaced before the positioning accuracy and the rigidity decrease. However, the known screw device where the shim is disposed has a problem that it is difficult to detect preload. This is because even if a force sensor (for example, a strain gauge) that detects an axial force is attached to an outer surface of the shim, the amount of axial strain on the shim is small; accordingly, the output of the force sensor is small.

Hence, there are, for example, problems that the output of the force sensor is susceptible to the influence of noise and the measurement resolution of the force sensor is low.

In the screw device described in Patent Literature 1, the force sensor is sandwiched between the two nuts. Accordingly, the output of the force sensor can be increased. However, a shim is not disposed between the two nuts. Accordingly, there are problems that the preload is not stable and the rigidity of the nut decreases.

Hence, an object of the present invention is to provide a screw device that can detect preload in a screw device where a shim is disposed between two nuts.

Solution to Problem

In order to solve the above problems, one aspect of the present invention is a preload detectable screw device including: a screw shaft having a helical outer groove; two nuts assembled to the screw shaft, the two nuts having a helical inner groove facing the outer groove; a plurality of rolling elements disposed between the outer groove of the screw shaft and the inner groove of each of the two nuts; a shim sandwiched and compressed between the two nuts; a coupling portion configured to couple the two nuts in such a manner as to be incapable of relative rotation to each other; and a force sensor for detecting preload, in which a contact surface of at least one of the two nuts with the shim, and/or a contact surface of the shim with at least one of the two nuts, is provided with a recess, spaced apart from the coupling portion, in such a manner as to reduce the contact area, and the force sensor is attached near the recess on an outer surface of the shim and/or an outer surface of at least one of the two nuts.

In order to solve the above problems, another aspect of the present invention is a preload detectable screw device including: a screw shaft having a helical outer groove; two nuts assembled to the screw shaft, the two nuts having a helical inner groove facing the outer groove; a plurality of rolling elements disposed between the outer groove of the screw shaft and the inner groove of each of the two nuts; a shim sandwiched and compressed between the two nuts; a coupling portion configured to couple the two nuts in such a manner as to be incapable of relative rotation to each other; and a force sensor for detecting preload, in which the shim is provided with at least one hole, spaced apart from the coupling portion, and the force sensor is attached near the hole on an outer surface of the shim.

Advantageous Effects of Invention

According to one aspect of the present invention, the recess is provided in the contact surface between the nut and the shim in such a manner as to reduce the contact area. Accordingly, stress represented by force/contact area (stress=force/contact area) can be locally increased. The force sensor is attached near the recess on the outer surface of the shim and/or the outer surface of the nut, where stress has been increased. Accordingly, the output of the force sensor can be increased. Moreover, a rotational force acts on the coupling portion. Accordingly, the recess is spaced apart from the coupling portion. Consequently, the rotational force, superimposed on preload, detected by the force sensor can be reduced, and it is possible to clearly detect the preload.

According to another aspect of the present invention, it is possible to locally reduce the rigidity of the outer surface of the shim near the hole while maintaining the rigidity of the entire shim to some extent. The force sensor is attached to the outer surface of the shim where the rigidity has locally been reduced. Accordingly, it is possible to increase the output of the force sensor and detect preload with higher resolution. Moreover, a rotational force acts on the coupling portion. Accordingly, the hole is spaced apart from the coupling portion. Consequently, the rotational force, superimposed on preload, detected by the force sensor can be reduced, and it is possible to clearly detect the preload.

DESCRIPTION OF EMBODIMENTS

A preload detectable screw device (hereinafter simply referred to as a screw device) of embodiments of the present invention is described in detail hereinafter with reference to the accompanying drawings. However, the screw device of the present invention can be embodied in various modes, and is not limited to the embodiments described in the description. The embodiments are provided with the intention of enabling those skilled in the art to fully understand the scope of the invention by fully disclosing the description.

First Embodiment

Figure 1:
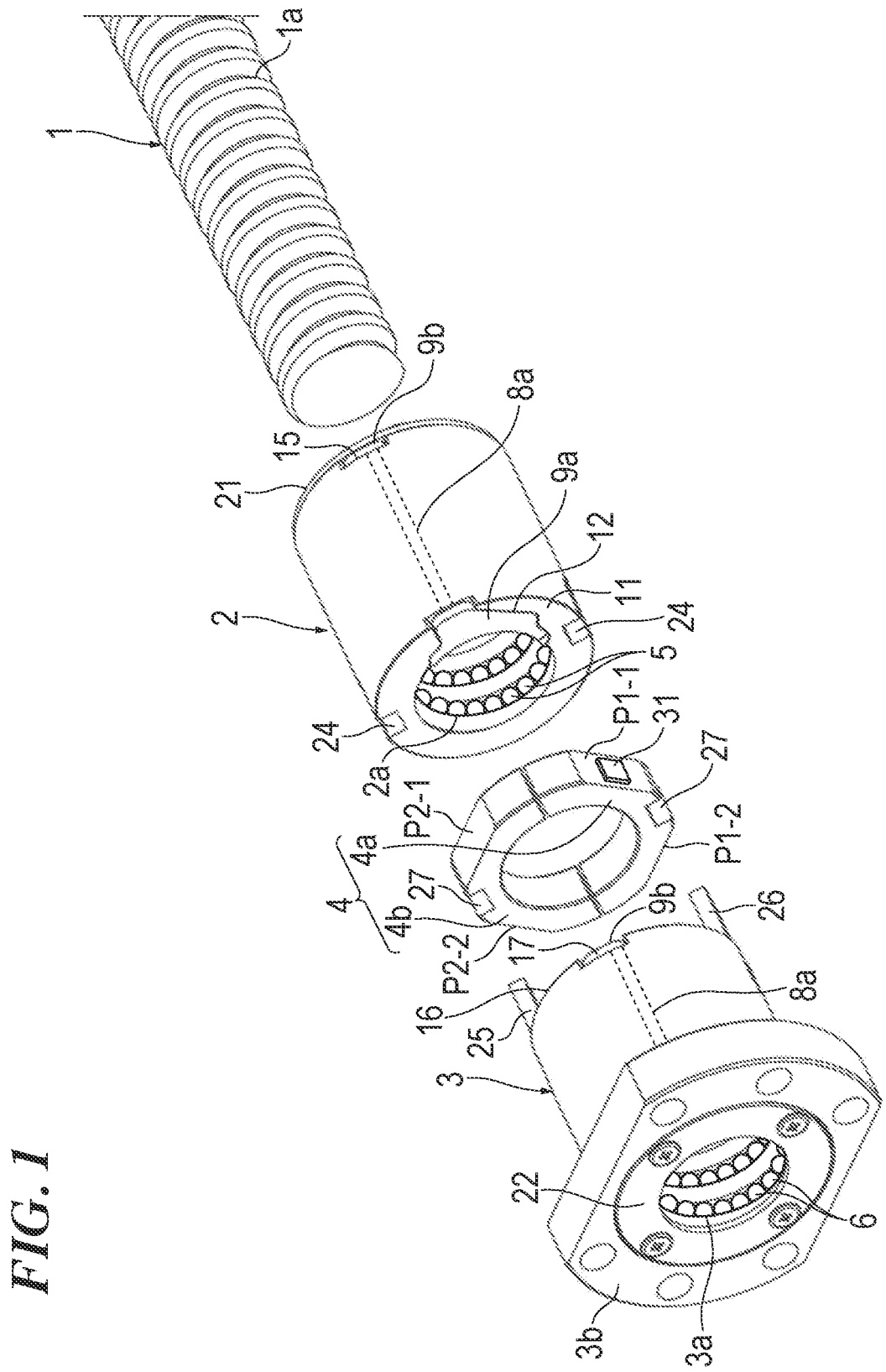
FIG. 1 is an exploded perspective view of a preload detectable screw device of a first embodiment of the present invention.
Figure 2:
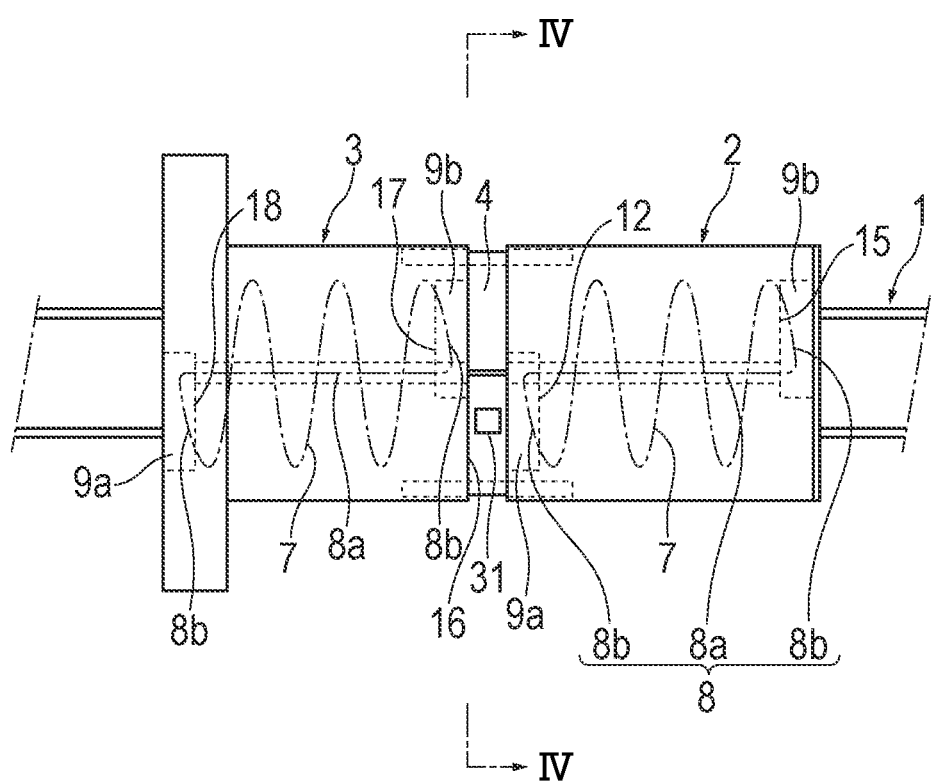
FIG. 2 is a side view of the preload detectable screw device of the first embodiment.

FIG. 1 illustrates an exploded perspective view of a screw device of a first embodiment of the present invention. FIG. 2 illustrates a side view thereof. The screw device of the embodiment is what is called a double nut ball screw, and includes a screw shaft 1, two nuts 2 and 3, a shim 4 sandwiched between the two nuts 2 and 3, and balls 5 and 6 as rolling elements disposed between the screw shaft 1 and each of the two nuts 2 and 3.

A helical outer groove 1a is formed in an outer surface of the screw shaft 1. The balls 5 and 6 roll along the outer groove 1a. The cross-sectional shape of the outer groove 1a is Gothic arch or circular arc.

The two nuts 2 and 3 are assembled to the screw shaft 1. The nuts 2 and 3 have a substantially tubular shape. Inner grooves 2a and 3a facing the outer groove 1a of the screw shaft 1 are formed in inner surfaces of the nuts 2 and 3. The cross-sectional shape of the inner grooves 2a and 3a is Gothic arch or circular arc.

The nut 3 being one of the two nuts is provided with a flange 3b to be attached to a counterpart component. The other nut 2 is not provided with a flange.

As illustrated in FIG. 2, a helical path 7 is formed between the outer groove 1a of the screw shaft 1 and the inner groove 2a of the nut 2. The balls 5 (refer to FIG. 1) are arranged in the path 7. The nut 2 is provided with a return path 8 connected to one end and the other end of the path 7 in such a manner that the balls 5 can circulate. The helical path 7 and a center line of the return path 8 are indicated by dot-and-dash lines in FIG. 2. In the embodiment, the return path 8 includes a through-hole 8a provided in the nut 2, and a pair of turn-around paths 8b connecting the through-hole 8a and the path 7. The turn-around paths 8b are formed in circulation portions 9a and 9b attached to end surfaces of the nut 2 in the axial direction. The circulation portion 9a or 9b scoops up the ball 5 rolling in the path 7 from the outer groove 1a of the screw shaft 1, and guides the ball 5 into the through-hole 8a. The ball 5 that has passed the through-hole 8a is returned again to the path 7 from the opposite circulation portion 9a or 9b. The path 7, the through-hole 8a, and the turn-around paths 8b are also formed in the nut 3 likewise. These configurations are the same. Accordingly, the same reference signs are assigned to the configurations and descriptions thereof are omitted.

Figure 3:
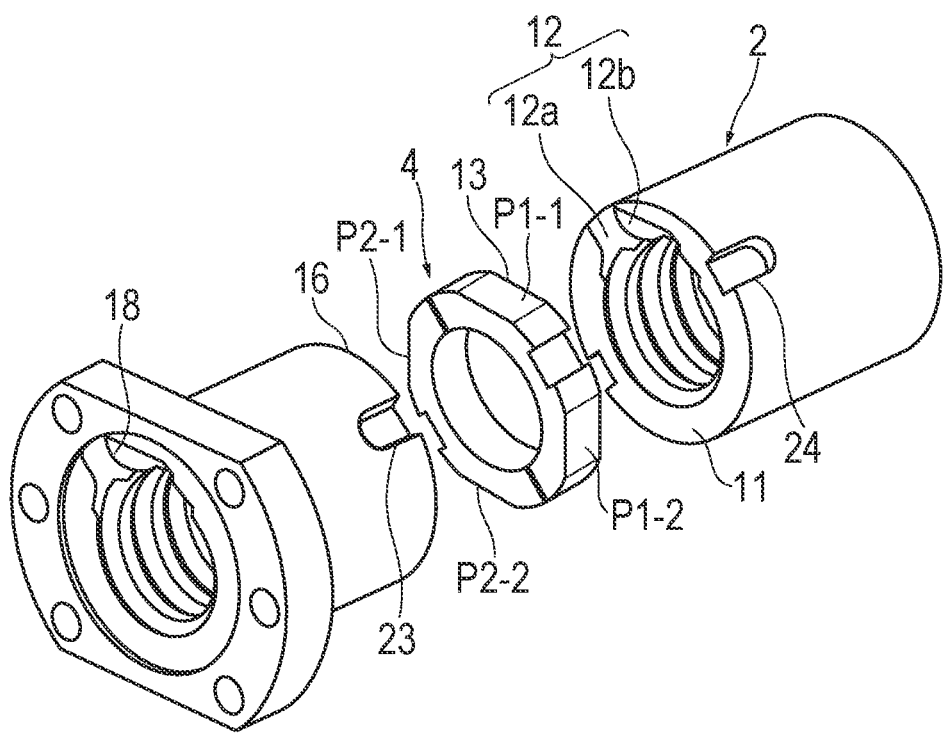
FIG. 3 is a view on arrow along line IV-IV in FIG. 2.

As illustrated in an exploded perspective view of the nuts 2 and 3 in FIG. 3, the end surface of the nut 2 in the axial direction, that is, a contact surface 11 of the nut 2 with the shim 4, is formed into a substantially annular shape. The substantially annular contact surface 11 is provided with a recess 12 where the circulation portion 9a is inserted (refer to FIG. 1). A contact surface 13, which faces the nut 2, of the shim 4 is not provided with a recess.

The recess 12 includes a bottom surface 12b and a side wall 12a. In the embodiment, as viewed in the axial direction, the recess 12 is formed into a substantially arc shape, and opens into inner and outer surfaces of the nut 2 (refer also to FIG. 4). With the recess 12, a thin portion 14 where the thickness in the radial direction is reduced is formed on an outer peripheral side of the contact surface 11.

As illustrated in FIG. 2, the other end surface of the nut 2 in the axial direction is also provided with a recess 15. The shape of the recess 15 is the same as the shape of the recess 12 when the nut 2 is rotated 180 degrees about an axis perpendicular to the paper surface of FIG. 2. Similarly, a contact surface 16 of the nut 3 with the shim 4 is also provided with a recess 17 (refer to FIG. 1). Moreover, the other end surface of the nut 3 in the axial direction is also provided with a recess 18 (refer to FIG. 3).

As illustrated in FIG. 1, the end surface, which is opposite to the shim 4, of the nut 2 is covered with a ring-shaped cap 21. Similarly, the end surface, which is opposite to the shim 4, of the nut 3 is covered with a ring-shaped cap 22. The caps 21 and 22 are attached to the nuts 2 and 3 by fastening members such as screws.

As illustrated in FIG. 2, the phases of the through-holes 8a of the two nuts 2 and 3 in the circumferential direction are caused to agree with each other in the embodiment. In the side view of FIG. 2, the circulation portion 9a of the nut 2 being one of the adjacent nuts and the circulation portion 9b of the other nut 3 are staggered, in other words, the circulation portion 9a of the one nut 2 is mainly placed lower than the through-hole 8a, and the circulation portion 9b of the other nut 3 is mainly placed higher than the through-hole 8a.

As illustrated in FIG. 3, keyways 23 and 24 are formed in the outer surfaces of the opposing end portions of the nuts 2 and 3. Keys 25 and 26 (refer to FIG. 1) as coupling portions that couple the two nuts 2 and 3 in such a manner as to be incapable of relative rotation are fitted in the keyways 23 and 24. Keyways 27 where the keys 25 and 26 are fitted are also formed in the shim 4.

As illustrated in FIG. 1, the shim 4 is sandwiched between the two nuts 2 and 3. The outside diameter of the shim 4 is less than the outside diameter of the nuts 2 and 3 (refer to FIG. 4). The shim 4 has a ring shape, and includes a pair of arc-shaped split shims 4a and 4b whose central angles are approximately 180 degrees. The keyways 27 where the keys 25 and 26 are fitted are formed in center portions of outer surfaces of the split shims 4a and 4b in the circumferential direction. A pair of flat surfaces P1-1 and P1-2 is formed on both sides of the keyway 27 of the split shim 4a in the circumferential direction. An inner surface of the split shim 4a is formed into a semi-cylindrical shape. A pair of flat surfaces P2-1 and P2-2 is formed on both sides of the keyway 27 of the split shim 4b in the circumferential direction. An inner surface of the split shim 4b is formed into a semi-cylindrical shape. The shim 4 can also be formed of a single component without being split.

Figure 4:
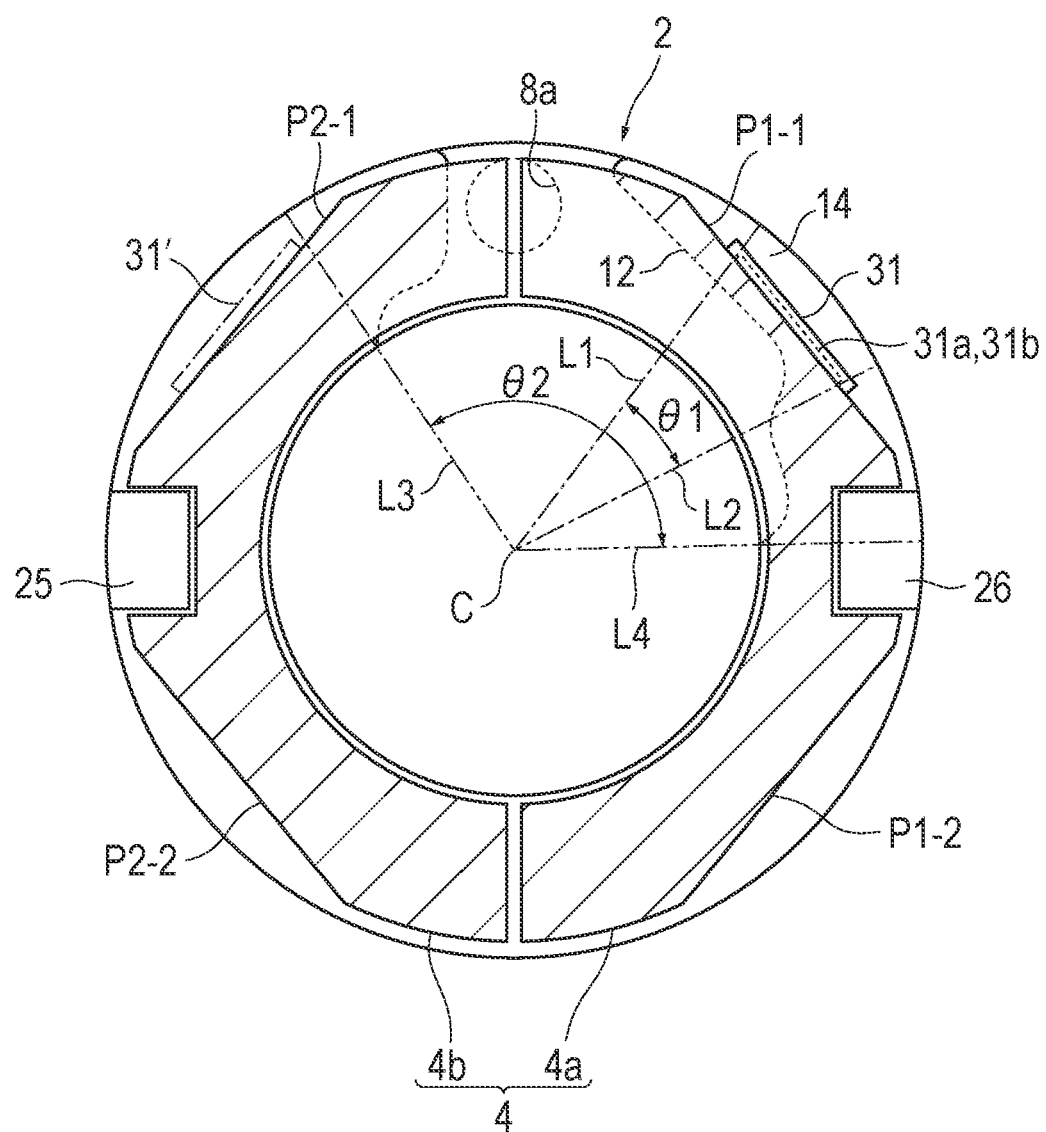
FIG. 4 is an exploded perspective view of a nut of the preload detectable screw device of the first embodiment.

As viewed in the axial direction of the shim 4 in FIG. 4, the recess 12 is provided in the contact surface of the nut 2. Accordingly, the area of contact between the nut 2 and the shim 4 is reduced by the area of the recess 12. The area of contact between the nut 2 and the shim 4 is hatched.

A force sensor 31 is attached near the recess 12 on the outer surface of the shim 4. Specifically, the force sensor 31 is attached to the flat surface P1-1 being one of the two flat surfaces P1-1 and P1-2 of the split shim 4a. The force sensor 31 is stuck on the flat surface P1-1 by an adhesive. If the force sensor 31 is attached to the flat surface P1-1, it is possible to reduce stress occurring on the force sensor 31. As indicated by a dot-and-dash line in FIG. 4, a force sensor 31' can also be attached to the flat surface P2-1 of the split shim 4b. This is because, as illustrated in FIG. 1, the flat surface P2-1 is placed near the recess 17 of the nut 3.

Figure 5:
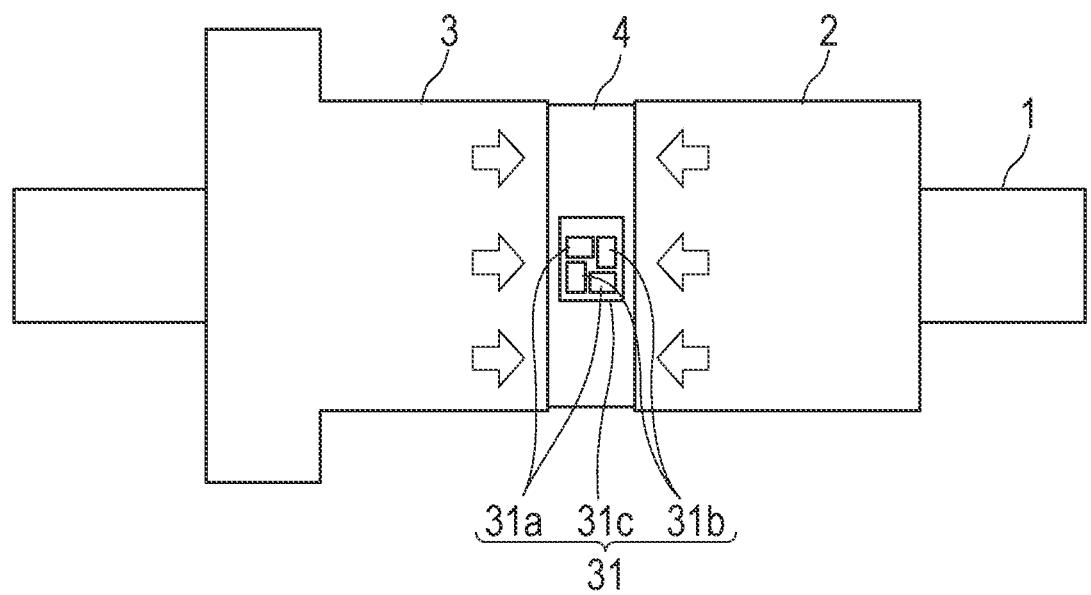
FIG. 5 is a schematic side view of the preload detectable screw device of the first embodiment.

As illustrated in FIG. 5, the shim 4 is sandwiched and compressed between the two nuts 2 and 3. The force sensor 31 detects an axial force, that is, preload. The force sensor 31 is, for example, a strain gauge, and includes a resin base 31c, and sensitive portions 31a and 31b that are embedded in the resin base 31c to measure strain on the shim 4. Unillustrated leads are connected to the sensitive portions 31a and 31b. The sensitive portions 31a and 31b include the first sensitive portion 31a that detects an axial force, and the second sensitive portion 31b that detects a circumferential force. A difference between the axial force and the circumferential force is measured. Accordingly, the axial force occurring due to thermal expansion can be cancelled.

As illustrated in FIG. 4, as viewed in the axial direction of the nut, a first fan-shaped virtual area (a fan-shaped area with a central angle θ1 surrounded by dot-and-dash lines; hereinafter referred to as θ1) of the nut 2 delimited by the sensitive portions 31a and 31b of the force sensor 31 is included in a second fan-shaped virtual area (a fan-shaped area with a central angle θ2 surrounded by long dashed double-short dashed lines; hereinafter referred to as θ2) of the nut 2 delimited by the recess 12. Here, the first fan-shaped virtual area θ1 is a fan-shaped area with a central angle less than 180 degrees, the fan-shaped area being delimited by a line L1 linking a virtual axis line C of the nut 2 and one end of the sensitive portions 31a and 31b in the circumferential direction, and a line L2 linking the virtual axis line C and the other end of the sensitive portions 31a and 31b in the circumferential direction. The second fan-shaped virtual area θ2 is a fan-shaped area with a central angle less than 180 degrees, the fan-shaped area being delimited by a line L3 linking the virtual axis line C and one end of the recess 12 in the circumferential direction, and a line L4 linking the virtual axis line C and the other end of the recess 12 in the circumferential direction.

As illustrated in FIG. 5, the shim 4 is sandwiched and compressed between the two nuts 2 and 3. The two nuts 2 and 3 are preloaded in the axial direction by the reaction force from the shim 4. The preload is detected by the force sensor 31. The force sensor 31 is connected to an unillustrated amplifier board. The amplifier board outputs output data obtained by digitizing a voltage signal. The output data is inputted into an unillustrated fault diagnosis system. The fault diagnosis system can judge a fault by comparing the output data of the force sensor 31 with a predetermined threshold, or can judge a fault by machine learning the output data of the force sensor 31, or can judge a fault by deep learning the output data of the force sensor 31 with artificial intelligence. Moreover, it is also possible to introduce the IoT and transmit the output data of the force sensor 31 to a cloud through an Internet line by a transmitter.

The effects of the screw device of the embodiment are described below:

The recess 12 is provided in the contact surface 11 of the nut 2 with the shim 4 in such a manner as to reduce the contact area. Accordingly, stress represented by force/contact area (stress=force/contact area) can be locally increased. The force sensor 31 is attached near the recess 12 on the outer surface of the shim 4 where stress has been increased. Accordingly, the output of the force sensor 31 can be increased. Moreover, a rotational force acts on the keys 25 and 26. Accordingly, the recess 12 is spaced apart from the keys 25 and 26. Consequently, the rotational force, superimposed on preload, detected by the force sensor 31 can be reduced, and it is possible to clearly detect the preload.

According to an FEM analysis and test results (described in detail below) of the screw device, it was found that higher stress occurs in a large area on the outer surface of the shim 4 without a recess than on the outer surface of the nut 2 with the recess 12. The force sensor 31 is attached to the outer surface of the shim 4. Accordingly, it is possible to further increase the output of the force sensor 31 as compared to a case where the force sensor 31 is attached to the outer surface of the nut 2.

As viewed in the axial direction of the nut 2, the first fan-shaped virtual area θ1 of the nut 2 delimited by the sensitive portions 31a and 31b of the force sensor 31 is included in the second fan-shaped virtual area θ2 of the nut 2 delimited by the recess 12. Accordingly, stress can be increased across the entire area of the sensitive portions 31a and 31*b* of the force sensor 31, and the output of the force sensor 31 can be further increased.

The outside diameter of the shim 4 is reduced as compared to the outside diameter of the nut 2. Accordingly, stress acting on the outer surface of the shim 4 can be further increased. Conversely, if the outside diameter of the shim 4 is increased as compared to the outside diameter of the nut 2, stress acting inside the shim 4 can be increased, but stress acting on the outer surface of the shim 4 cannot be increased.

The recess 12 is the recess 12 for the circulation portion 9*a* for circulating the balls 5. Accordingly, it is possible to increase the area of the recess 12 and further increase the stress that acts on the outer surface of the shim 4.

The shim 4 is split into two, and the keys 25 and 26 are fitted in the pair of split shims 4*a* and 4*b*, respectively. Accordingly, the assembly is easier than in a case where the shim 4 is formed into a ring shape, and a rotational force acting on the pair of split shims 4*a* and 4*b* from the keys 25 and 26 can be reduced.

The force sensor 31 includes the first sensitive portion 31*a* that detects an axial force on the shim 4, and the second sensitive portion 31*b* that detects a circumferential force on the shim 4. Accordingly, it is possible to measure a difference between the axial force and the circumferential force and cancel the axial force occurring due to thermal expansion.

Second Embodiment

Figure 6:
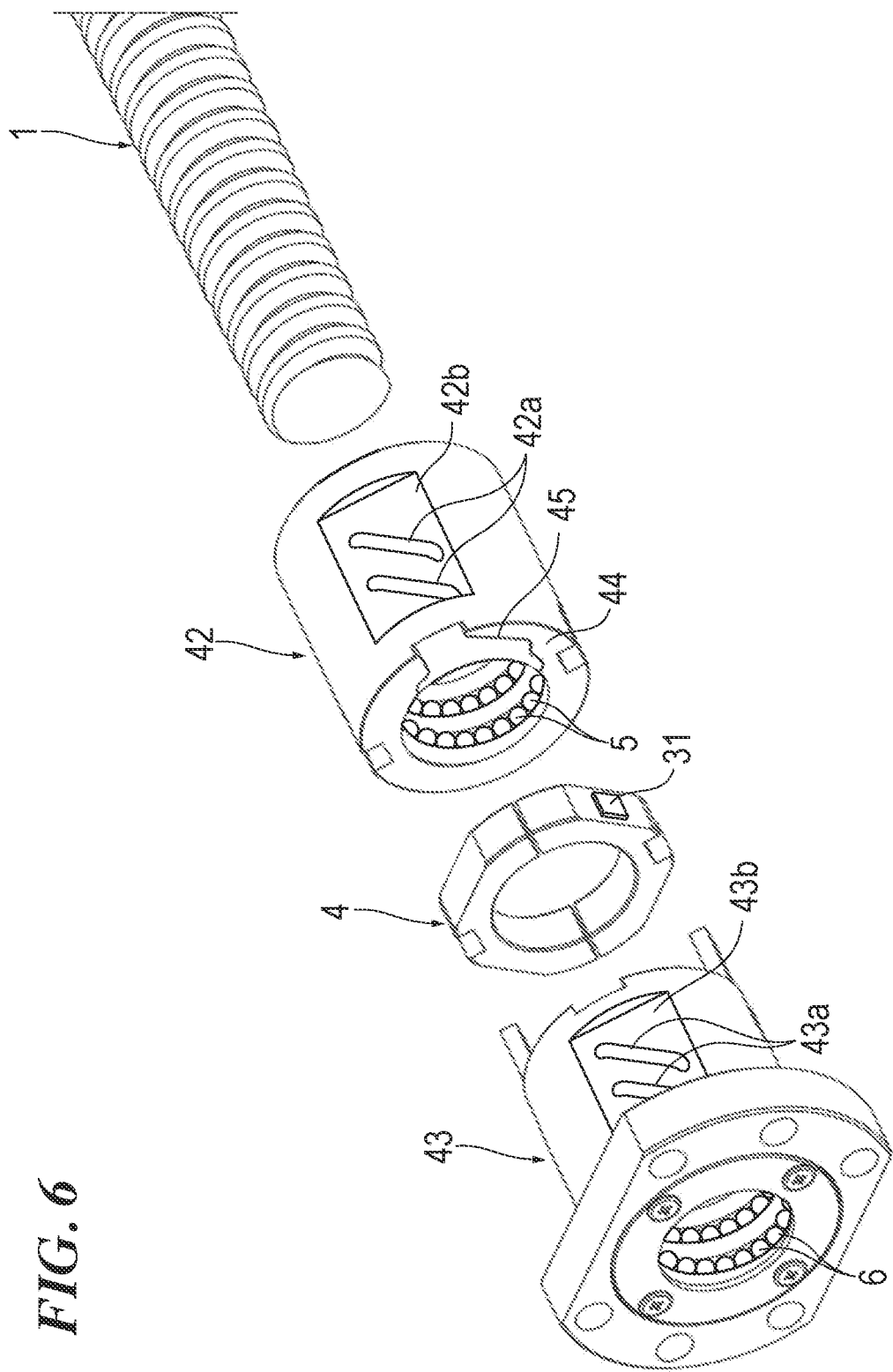
FIG. 6 is an exploded perspective view of a preload detectable screw device of a second embodiment of the present invention.

FIG. 6 illustrates an exploded perspective view of a screw device of a second embodiment of the present invention. The screw device of the second embodiment also includes a screw shaft 1, two nuts 42 and 43, a shim 4 sandwiched between the two nuts 42 and 43, and balls 5 and 6 disposed between the screw shaft 1 and the two nuts 42 and 43. The configurations of the screw shaft 1, the shim 4, and the balls 5 and 6 are the same as those of the first embodiment. Accordingly, the same reference signs are assigned to the screw shaft 1, the shim 4, and the balls 5 and 6, and descriptions thereof are omitted.

In the first embodiment, the ball 5 is circulated using the circulation portion 9*a* fitted in the recess 12 in the contact surface 11 of the nut 2. However, in the second embodiment, the ball 5 is circulated using, for example, two return pipes 42*a*. A flat portion 42*b* is formed on an outer surface of the nut 42. The return pipes 42*a* are mounted on the flat portion 42*b*. The return pipe 42*a* is bent at both end portions thereof and formed into a double-housing shape. Both end portions of the return pipe 42*a* penetrate the nut 42 in the axial direction. One end portion of the return pipe 42*a* is connected to one end of an inner groove of the nut 42, and the other end portion of the return pipe 42*a* is connected to the other end of the inner groove of the nut 42. The ball 5 that rolls along a helical path between the outer groove 1*a* of the screw shaft 1 and the inner groove of the nut 42 is scooped up at one end portion of the return pipe 42*a*, passes the return pipe 42*a*, and then is returned again to the path from the other end portion of the return pipe 42*a*. Return pipes 43*a* are also mounted on the nut 43 likewise.

A contact surface 44 of the nut 42 with the shim 4 is provided with a recess 45 similar to the recess 12 of the screw device of the first embodiment. A circulation portion is not inserted into the recess 45, and the recess 45 is hollow inside. The contact surface 44 of the nut 42 with the shim 4 is provided with the recess 45; accordingly, it is possible to increase the output of the force sensor 31 that is attached to the outer surface of the shim 4 as in the screw device of the first embodiment.

The present invention is not limited to the realization of the embodiments, and can be modified into other embodiments within the scope that does not change the gist of the present invention.

In the embodiments, the recess is provided in the contact surface of the nut with the shim. However, the recess can also be provided in the contact surface of the shim with the nut.

In the embodiments, the force sensor is attached to the outer surface of the shim. However, high stress also occurs near the recess on the outer surface of the nut. Accordingly, the force sensor can also be attached to the outer surface of the nut (refer to a first example described below). If the force sensor is attached to the outer surface of the nut, the force sensor is attached on the shim side with respect to the helical path between the outer groove of the screw shaft and the inner groove of the nut.

In the embodiments, the sensitive portion of the force sensor includes the first sensitive portion that detects an axial force, and the second sensitive portion that detects a circumferential force. However, it can also be configured in such a manner that the sensitive portion of the force sensor includes only the first sensitive portion that detects an axial force and a force sensor that detects a circumferential force is provided on another flat surface.

Third Embodiment

Figure 9:
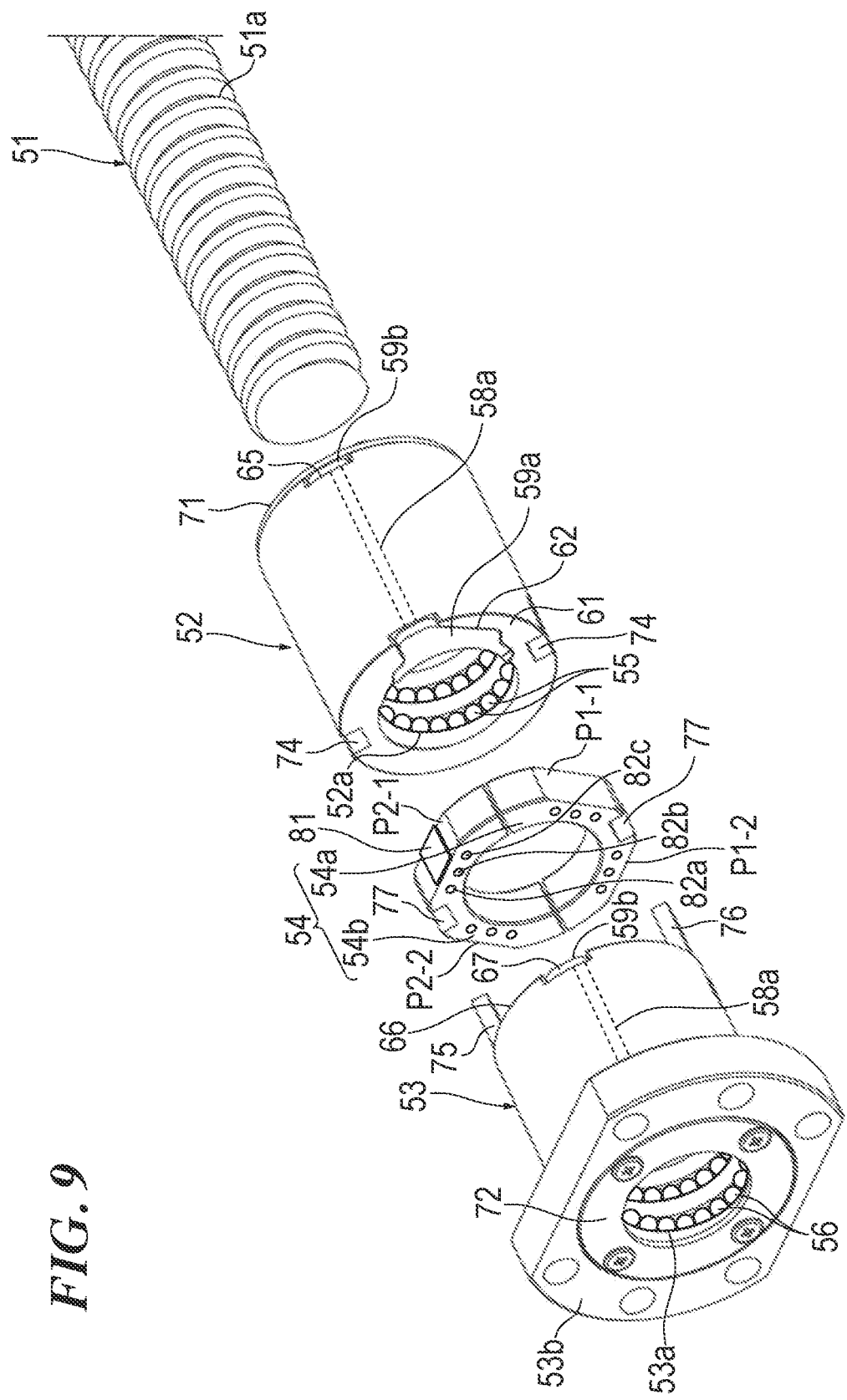
FIG. 9 is an exploded perspective view of a preload detectable screw device of a third embodiment of the present invention.
Figure 10:
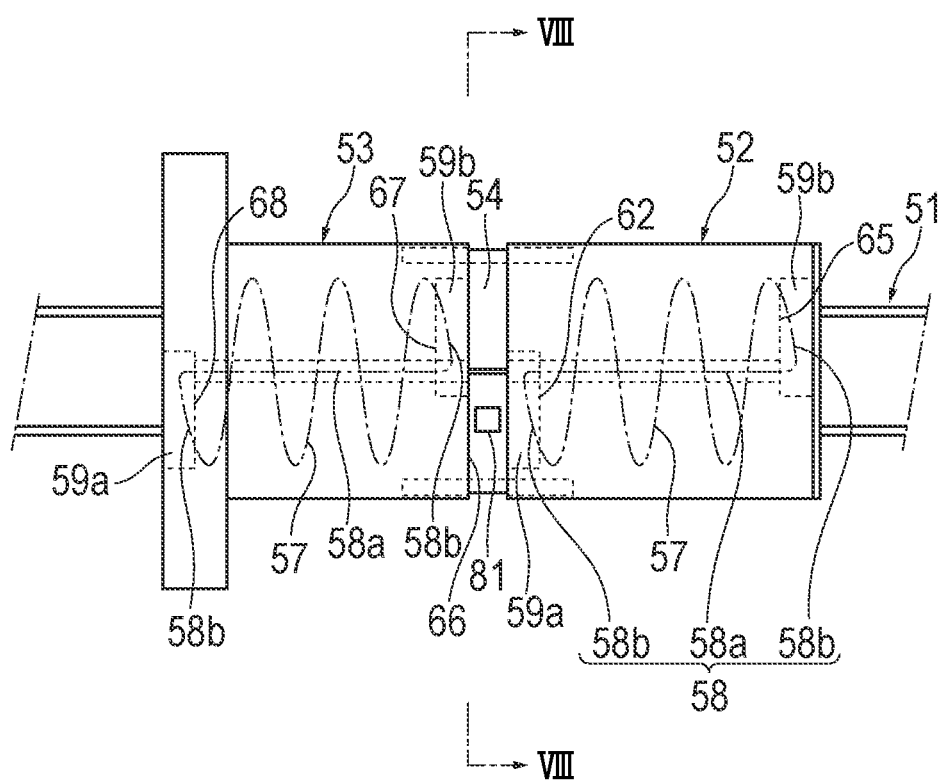
FIG. 10 is a side view of the preload detectable screw device of the third embodiment.

FIG. 9 illustrates an exploded perspective view of a screw device of a third embodiment of the present invention. FIG. 10 illustrates a side view thereof. The screw device of the embodiment is what is called a double nut ball screw, and includes a screw shaft 51, two nuts 52 and 53, a shim 54 sandwiched between the two nuts 52 and 53, and balls 55 and 56 as rolling elements disposed between the screw shaft 51 and each of the two nuts 52 and 53.

A helical outer groove 51*a* is formed in an outer surface of the screw shaft 51. The balls 55 and 56 roll along the outer groove 51*a*. The cross-sectional shape of the outer groove 51*a* is Gothic arch or circular arc.

The two nuts 52 and 53 are assembled to the screw shaft 51. The nuts 52 and 53 have a substantially tubular shape. Inner grooves 52*a* and 53*a* facing the outer groove 51*a* of the screw shaft 51 are formed in inner surfaces of the nuts 52 and 53. The cross-sectional shape of the inner grooves 52*a* and 53*a* is Gothic arch or circular arc. The nut 53 being one of the two nuts is provided with a flange 53*b* to be attached to a counterpart component. The other nut 52 is not provided with a flange.

As illustrated in FIG. 10, a helical path 57 is formed between the outer groove 51*a* of the screw shaft 51 and the inner groove 52*a* of the nut 52. The balls 55 (refer to FIG. 9) are arranged in the path 57. The nut 52 is provided with a return path 58 connected to one end and the other end of the path 57 in such a manner that the balls 55 can circulate. The helical path 57 and a center line of the return path 58 are indicated by dot-and-dash lines in FIG. 10. In the embodiment, the return path 58 includes a through-hole 58*a* provided in the nut 52, and a pair of turn-around paths 58*b* connecting the through-hole 58*a* and the path 57. The turn-around paths 58*b* are formed in circulation portions 59*a* and 59*b* attached to end surfaces of the nut 52 in the axial direction.

The circulation portion 59a or 59b scoops up the ball 55 rolling in the path 57 from the outer groove 51a of the screw shaft 51, and guides the ball 55 into the through-hole 58a. The ball 55 that has passed the through-hole 58a is returned again to the path 57 from the opposite circulation portion 59a or 59b. The path 57, the through-hole 58a, and the turn-around paths 58b are also formed in the nut 53 likewise. These configurations are the same. Accordingly, the same reference signs are assigned to the configurations and descriptions thereof are omitted.

Figure 11:
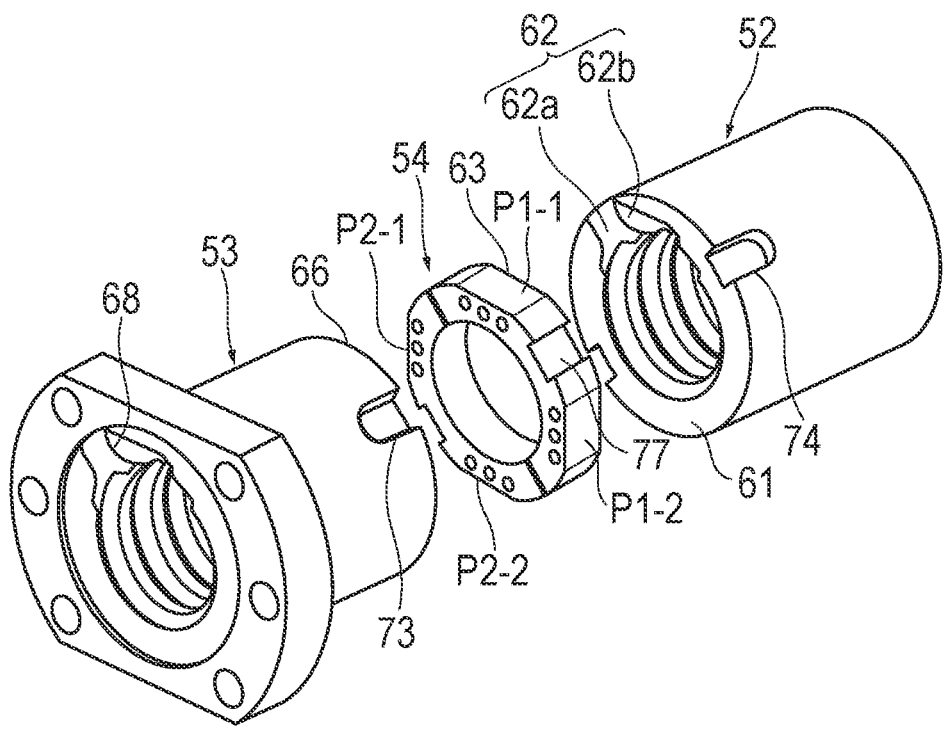
FIG. 11 is an exploded perspective view of a nut of the preload detectable screw device of the third embodiment.

As illustrated in an exploded perspective view of the nuts 52 and 53 in FIG. 11, the end surface of the nut 52 in the axial direction, that is, a contact surface 61 of the nut 52 with the shim 54, is formed into a substantially annular shape. The substantially annular contact surface 61 is provided with a recess 62 where the circulation portion 59a is inserted (refer to FIG. 9). A contact surface 63 of the shim 54 with the nut 52 is a flat surface.

As illustrated in FIG. 10, the other end surface of the nut 52 in the axial direction is also provided with a recess 65 where the circulation portion 59b is inserted. The shape of the recess 65 is the same as the shape of the recess 62 when the nut 52 is rotated 180 degrees about an axis perpendicular to the paper surface of FIG. 10. A contact surface 66 of the nut 53 with the shim 54 is also provided with a recess 67 (refer to FIG. 9) where the circulation portion 59b is inserted. Moreover, the other end surface of the nut 53 in the axial direction is also provided with a recess 68 (refer to FIG. 11) where the circulation portion 59a is inserted.

As illustrated in FIG. 9, the end surface, which is opposite to the shim 54, of the nut 52 is covered with a ring-shaped cap 71. Similarly, the end surface, which is opposite to the shim 54, of the nut 53 is covered with a ring-shaped cap 72. The caps 71 and 72 are attached to the nuts 52 and 53 by fastening members such as screws.

As illustrated in FIG. 10, the phases of the through-holes 58a of the two nuts 52 and 53 in the circumferential direction are caused to agree with each other in the embodiment. In the side view of FIG. 10, the circulation portion 59a of the nut 52 being one of the adjacent nuts and the circulation portion 59b of the other nut 53 are staggered, in other words, the circulation portion 59a of the one nut 52 is mainly placed lower than the through-hole 58a, and the circulation portion 59b of the other nut 53 is mainly placed higher than the through-hole 58a.

As illustrated in FIG. 11, keyways 73 and 74 are formed in outer surfaces of the opposing end portions of the nuts 52 and 53. As illustrated in FIG. 9, keys 75 and 76 as coupling portions that couple the two nuts 52 and 53 in such a manner as to be incapable of relative rotation are fitted in the keyways 73 and 74. Keyways 77 where the keys 75 and 76 are fitted are also formed in the shim 54.

Figure 12:
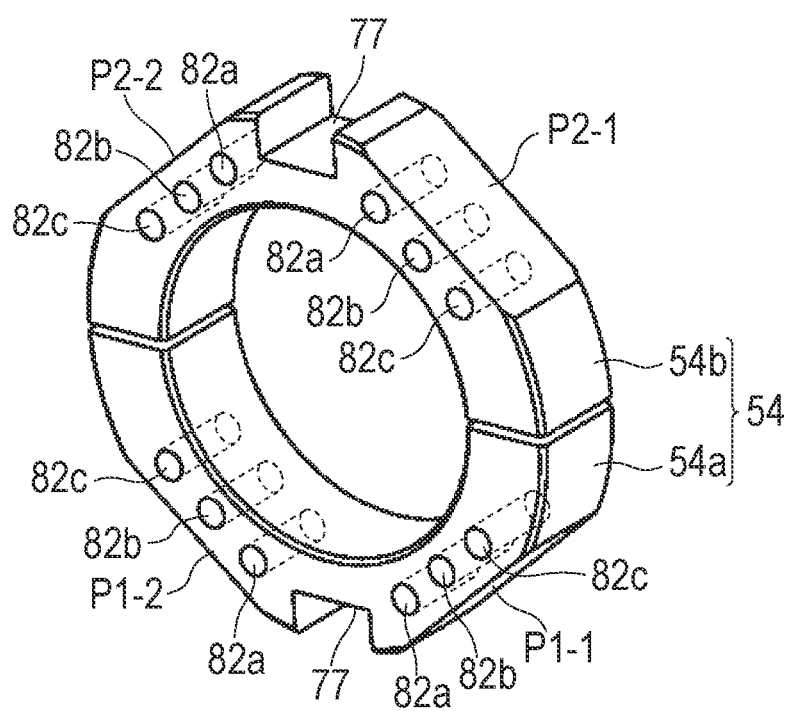
FIG. 12 is a perspective view of a shim of the preload detectable screw device of the third embodiment.

As illustrated in FIG. 12, the shim 54 has a ring shape, and includes a pair of arc-shaped split shims 54a and 54b whose central angles are approximately 180 degrees. The outside diameter of the shim 54 is less than the outside diameter of the nuts 52 and 53 (refer to FIG. 13). The keyways 77 where the keys 75 and 76 are fitted are formed in center portions of outer surfaces of the split shims 54a and 54b in the circumferential direction. A pair of flat surfaces P1-1 and P1-2 is formed on both sides of the keyway 77 of the split shim 54a in the circumferential direction.

A pair of flat surfaces P2-1 and P2-2 is formed on both sides of the keyway 77 of the split shim 54b in the circumferential direction. The shim 54 can also be formed of a single component without being split.

A plurality of axial holes 82a, 82b, and 82c extending in the axial direction of the shim 54 is provided in each of the split shims 54a an 54b. Specifically, the plurality of, for example, three holes 82a, 82b, and 82c are provided below each of the flat surfaces P1-1, P1-2, P2-1, and P2-2 of the split shims 54a and 54b. The holes 82a, 82b, and 82c penetrate from one end surface to the other end surface of the shim 54 in the axial direction. The holes 82a, 82b, and 82c have a cylindrical shape.

Figure 13:
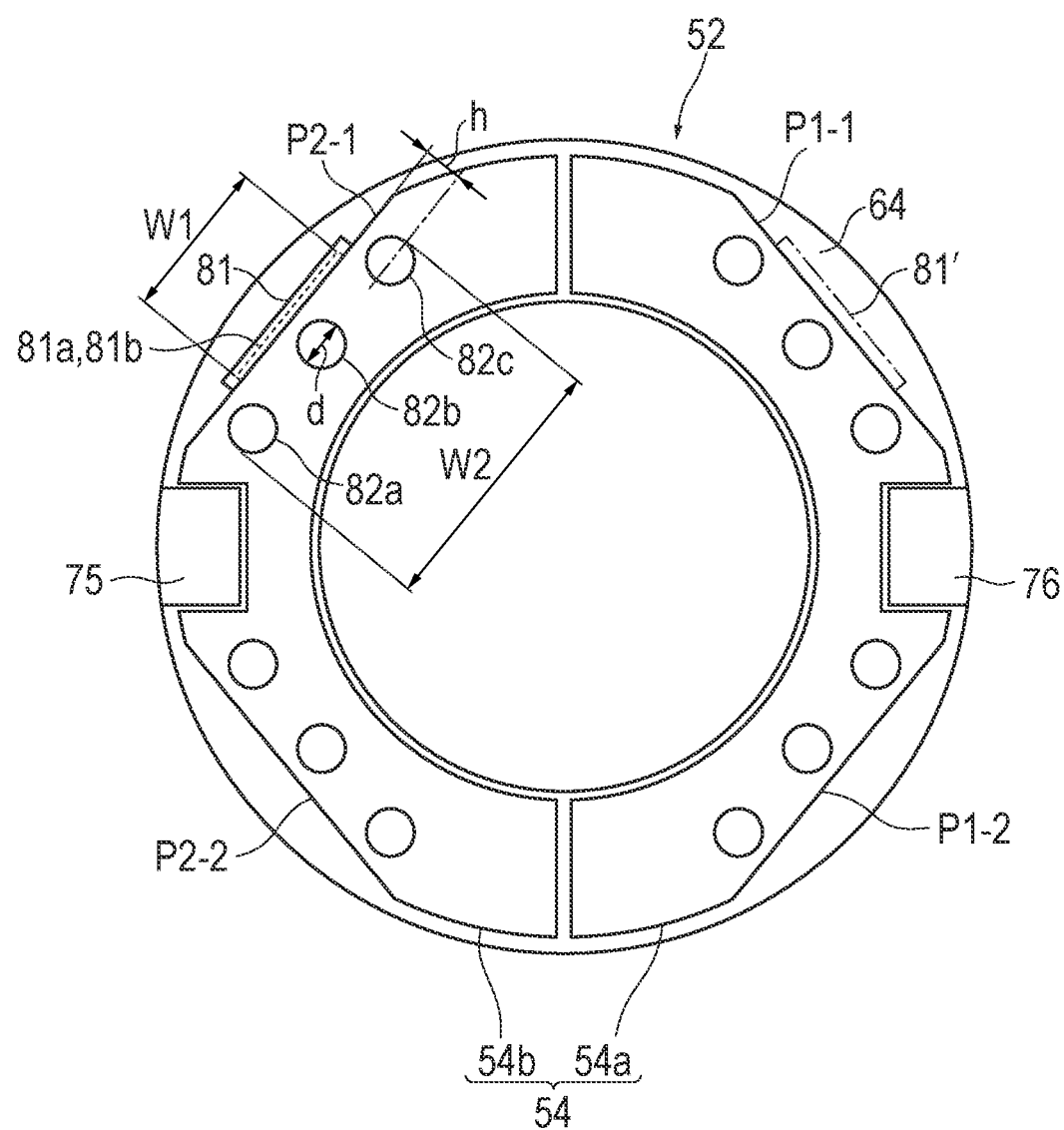
FIG. 13 is a view on arrow along line XIII-XIII in FIG. 10.

As viewed in the axial direction of the shim 54 in FIG. 13, a force sensor 81 is attached near the holes 82a, 82b, and 82c on the outer surface of the shim 54. Specifically, the force sensor 81 is attached to the flat surface P2-1 being one of the two flat surfaces P2-1 and P2-2 of the split shim 54b. The flat surface P2-1 is near the recess 67 (refer to FIG. 9) of the nut 53. As indicated by a dot-and-dash line in FIG. 13, a force sensor 81' can also be attached to the flat surface P1-1 of the split shim 54a. This is because, as illustrated in FIG. 9, the flat surface P1-1 is near the recess 62 of the nut 52. The force sensor 81 is stuck on the flat surface P2-1 by an adhesive. If the force sensor 81 is attached to the flat surface P2-1, it is possible to reduce stress occurring on the force sensor 81.

Figure 14:
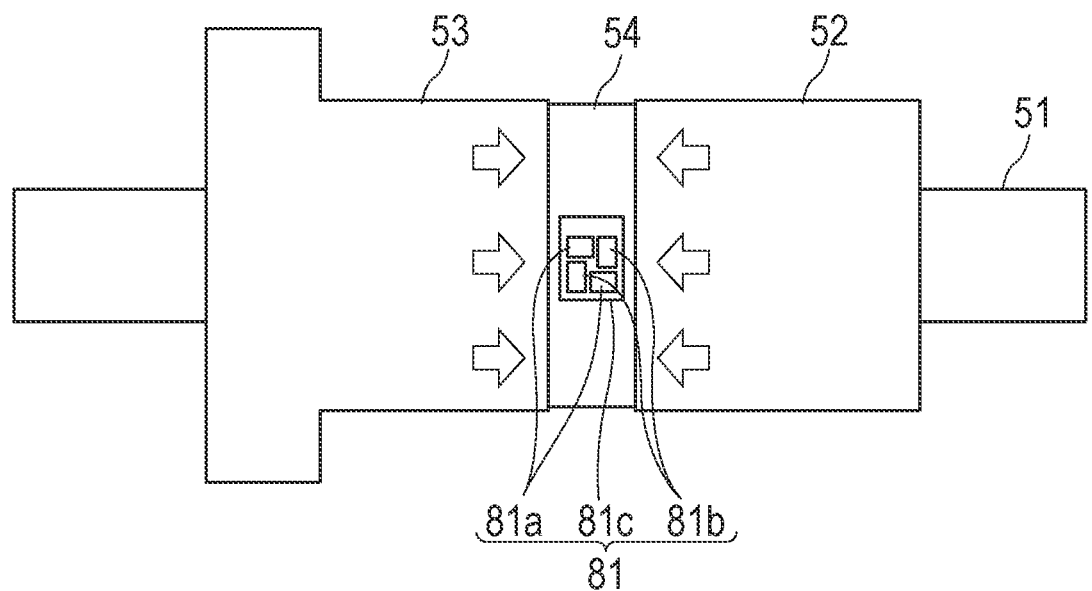
FIG. 14 is a schematic side view of the preload detectable screw device of the third embodiment.

As illustrated in FIG. 14, the force sensor 81 is, for example, a strain gauge, and includes a resin base 81c, and sensitive portions 81a and 81b that are embedded in the resin base 81c to measure strain on the shim 54. Unillustrated leads are connected to the sensitive portions 81a and 81b. The sensitive portions 81a and 81b include the first sensitive portion 81a that detects an axial force, and the second sensitive portion 81b that detects a circumferential force. A difference between the axial force and the circumferential force is measured. Accordingly, the axial force occurring due to thermal expansion can be cancelled.

As illustrated in FIG. 13, as viewed in the axial direction of the shim 54, the holes 82a, 82b, and 82c are arranged substantially parallel to the flat surface P2-1 at a substantially constant depth h from the flat surface P2-1. A breadth W1 of the sensitive portions 81a and 81b of the force sensor 81 is less than a breadth W2 of an area of the holes 82a, 82b, and 82c behind the force sensor 81. Moreover, the breadth W1 of the sensitive portions 81a and 81b of the force sensor 81 is greater than a diameter d of each of the holes 82a, 82b, and 82c. The diameter d of each of the holes 82a, 82b, and 82c is substantially the same.

As illustrated in FIG. 14, the shim 54 is sandwiched and compressed between the two nuts 52 and 53. The two nuts 52 and 53 are preloaded in the axial direction by the reaction force from the shim 54. The preload is detected by the force sensor 81. The force sensor 81 is connected to an unillustrated amplifier board. The amplifier board outputs output data obtained by digitizing a voltage signal. The output data is inputted into an unillustrated fault diagnosis system. The fault diagnosis system can judge a fault by comparing the output data of the force sensor 81 with a predetermined threshold, or can judge a fault by machine learning the output data of the force sensor 81, or can judge a fault by deep learning the output data of the force sensor 81 with artificial intelligence. Moreover, it is also possible to introduce the IoT and transmit the output data of the force sensor 81 to a cloud through an Internet line by a transmitter.

The effects of the screw device of the embodiment are described below:

The holes 82a, 82b, and 82c are provided in the shim 54, spaced apart from the keys 75 and 76. Accordingly, it is possible to locally reduce the rigidity of the flat surface P2-1 of the shim 54 near the holes 82a, 82b, and 82c while maintaining the rigidity of the entire shim 54 to some extent.

The force sensor 81 is attached to the flat surface P2-1 where the rigidity has locally been reduced. Accordingly, it is possible to increase the output of the force sensor 81 and detect preload with higher resolution. Moreover, a rotational force acts on the keys 75 and 76. Accordingly, the holes 82a, 82b, and 82c are spaced apart from the keys 75 and 76. Consequently, the rotational force, superimposed on preload, detected by the force sensor 81 can be reduced, and it is possible to clearly detect the preload.

The holes 82a, 82b, and 82c extend in the axial direction of the shim 54. Accordingly, it is possible to prevent a reduction in the rigidity of the entire shim 54 related to preload in the axial direction. Moreover, the holes 82a, 82b, and 82c do not appear on the outer surface of the shim 54. Accordingly, it is easy to secure space for attaching the force sensor 81 on the outer surface of the shim 54.

The contact surface 66 of the nut 53 with the shim 54 is provided with the recess 67. Accordingly, stress represented by force/contact area (stress=force/contact area) can be increased. The force sensor 81 is attached near the recess 67 of the nut 53 on the flat surface P2-1 of the shim 54 where stress has been increased. Accordingly, it is possible to increase the output of the force sensor 81.

The shim 54 is split into two. The holes 82a, 82b, and 82c are provided in each of the pair of split shims 54a and 54b. Accordingly, it is possible to make the rigidity of the shim 54 substantially uniform in the circumferential direction.

Fourth Embodiment

Figure 15:
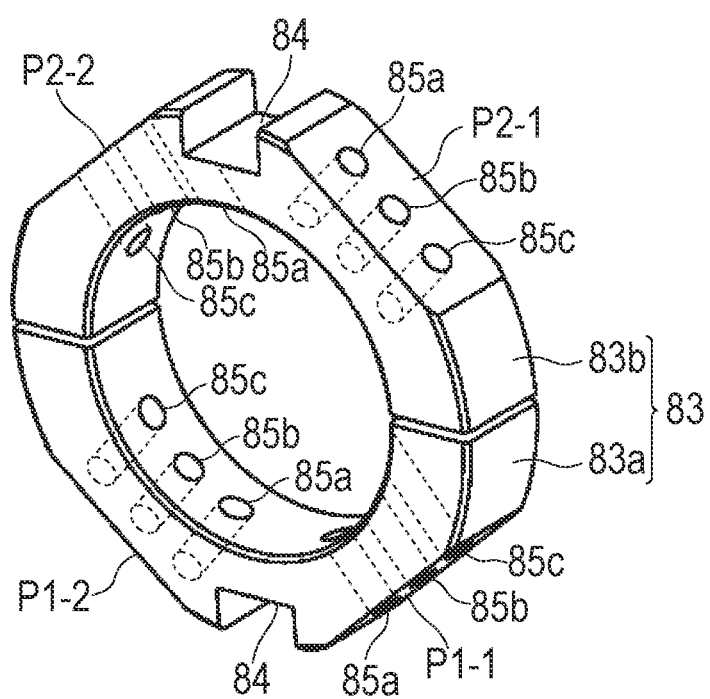
FIG. 15 is a perspective view of a shim of a preload detectable screw device of a fourth embodiment of the present invention.

FIG. 15 illustrates a shim 83 of a screw device of a fourth embodiment of the present invention. The configurations of a screw shaft 51, and two nuts 52 and 53 are the same as those of the third embodiment, and illustrations thereof are omitted.

As illustrated in FIG. 15, the shim 83 of the fourth embodiment includes a pair of arc-shaped split shims 83a and 83b whose central angles are approximately 180 degrees as in the shim 54 of the third embodiment. Keyways 84 where the keys 75 and 76 are fitted are formed in center portions of outer surfaces of the split shims 83a and 83b in the circumferential direction. A pair of flat surfaces P1-1 and P1-2 is formed on both sides of the keyway 84 of the split shim 83a in the circumferential direction. A pair of flat surfaces P2-1 and P2-2 is formed on both sides of the keyway 84 of the split shim 83b in the circumferential direction.

A plurality of perpendicular holes 85a, 85b, and 85c extending in a direction perpendicular to the flat surface P1-1, P1-2, P2-1, or P2-2 of the shim 83 is provided in each of the split shims 83a and 83b. In the embodiment, the plurality of, for example, three holes 85a, 85b, and 85c are provided in each of the flat surfaces P1-1, P1-2, P2-1, and P2-2 of the split shims 83a and 83b. The holes 85a, 85b, and 85c are arranged in a direction perpendicular to an axis line of the shim 83 in each of the flat surfaces P1-1, P1-2, P2-1, and P2-2. The diameters of the holes 85a, 85b, and 85c are substantially the same. The holes 85a, 85b, and 85c penetrate from an outer surface to an inner surface of the shim 83. The holes 85a, 85b, and 85c are formed into a cylindrical shape.

Figure 16:
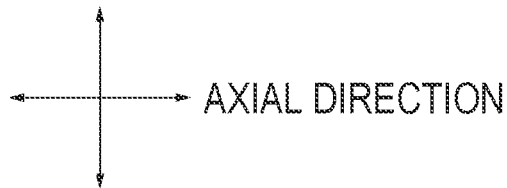
FIG. 16 is a partial side view of the shim of the preload detectable screw device of the fourth embodiment.
Figure 16:
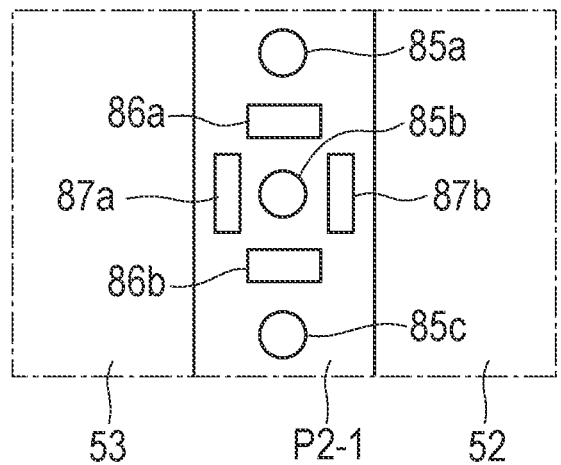

As illustrated in a partial side view (a side view as viewed in a direction orthogonal to the flat surface P2-1) of the shim 83 in FIG. 16, force sensors 86a and 86b are attached to the flat surface P2-1 of the shim 83. Specifically, the force sensors 86a and 86b are attached, adjacent to the holes 85a, 85b, and 85c in the circumferential direction of the shim 83, at substantially the same position as the holes 85a, 85b, and 85c in the axial direction of the shim 83. The force sensors 86a and 86b detect an axial force (that is, compressive strain). The force sensors 86a and 86b are placed between the holes 85a and 85b and between the holes 85b and 85c. Moreover, force sensors 87a and 87b are attached adjacent in the axial direction to the hole 85b. The force sensors 87a and 87b detect a circumferential force (that is, circumferential strain) on the shim 83.

According to the screw device of the fourth embodiment, the following effects are exerted:

The holes 85a, 85b, and 85c extend in the direction perpendicular to the flat surface P2-1 of the shim 83. Accordingly, it is possible to reduce the rigidity of the flat surface P2-1. The force sensors 86a, 86b, 87a, and 87b are attached to the flat surface P2-1 where the rigidity has been reduced. Accordingly, it is possible to increase the output of the force sensors 86a, 86b, 87a, and 87b.

The force sensors 86a and 86b are placed, adjacent to the holes 85a, 85b, and 85c in the circumferential direction of the shim 83, at substantially the same position as the holes 85a, 85b, and 85c in the axial direction of the shim 83. Accordingly, it is possible to place the force sensors 86a and 86b in the portion where the rigidity has especially been reduced on the flat surface P2-1 (refer to a second example described below). Hence, it is possible to increase the output of the force sensors 86a and 86b that detect an axial force.

The force sensors 86a and 86b that detect an axial force and the force sensors 87a and 87b that detect a circumferential force are provided. Accordingly, it is possible to measure a difference between the axial force and the circumferential force and cancel the axial force occurring due to thermal expansion.

Fifth Embodiment

Figure 17:
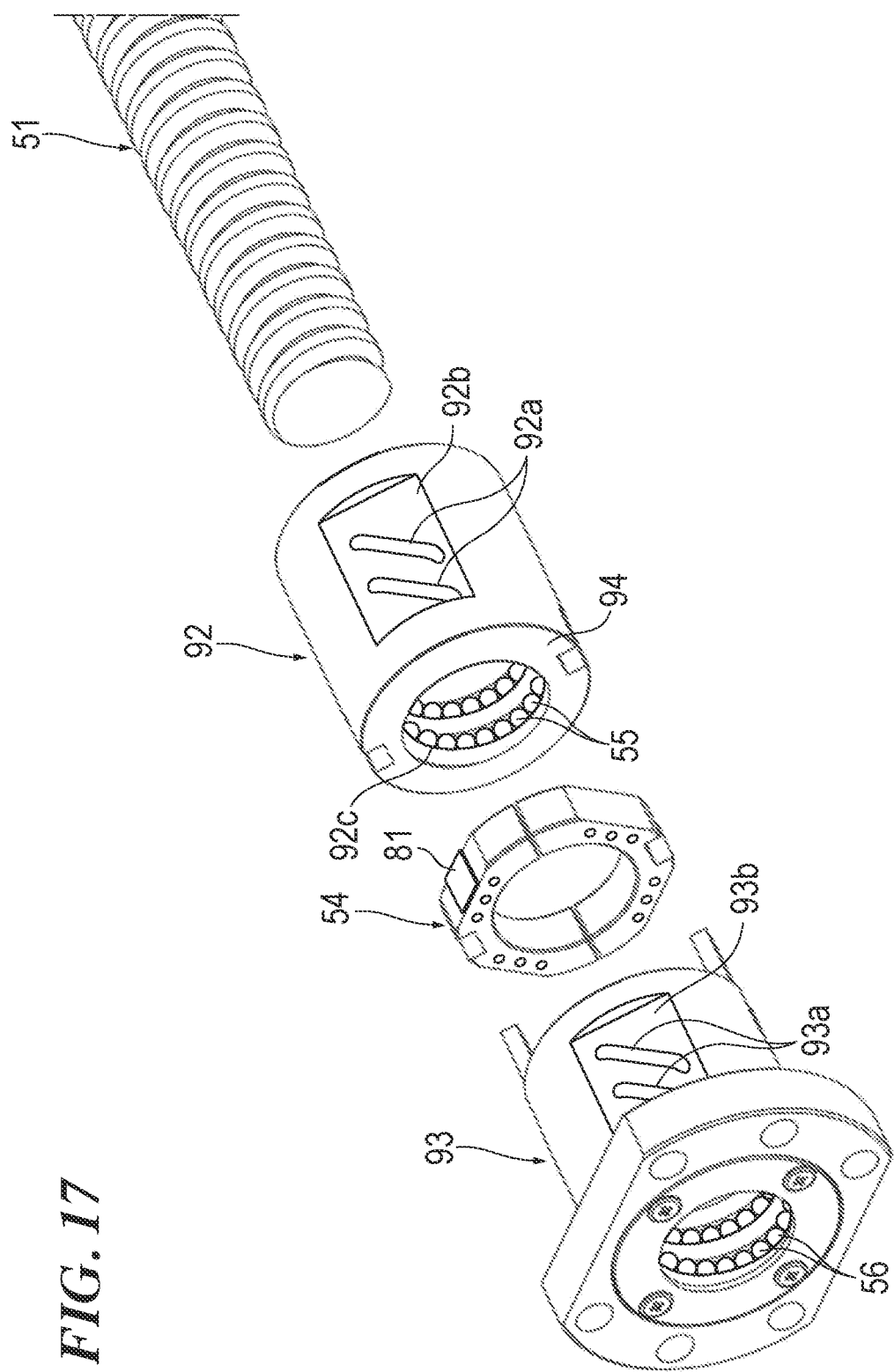
FIG. 17 is an exploded perspective view of a preload detectable screw device of a fifth embodiment of the present invention.

FIG. 17 illustrates an exploded perspective view of a screw device of a fifth embodiment of the present invention. The screw device of the fifth embodiment also includes a screw shaft 51, two nuts 92 and 93, a shim 54 sandwiched between the two nuts 92 and 93, and balls 55 and 56 disposed between the screw shaft 51 and the two nuts 92 and 93. The configurations of the screw shaft 51, the shim 54, and the balls 55 and 56 are the same as those of the third embodiment. Accordingly, the same reference signs are assigned to the screw shaft 51, the shim 54, and the balls 55 and 56, and descriptions thereof are omitted.

In the third embodiment, the balls 55 and 56 are circulated using the circulation portions 59a and 59b fitted in the recesses 62, 65, 67, and 68 in the end surfaces of the nuts 52 and 53 in the axial direction. However, in the fifth embodiment, the balls 55 and 56 are circulated using return pipes 92a and 93a mounted on the nuts 92 and 93. A flat portion 92b is formed on an outer surface of the nut 92. The return pipe 92a is mounted on the flat portion 92b. The return pipe 92a is bent at both end portions thereof and formed into a double-housing shape. Both end portions of the return pipe 92a penetrate the nut 92 in the axial direction. One end portion of the return pipe 92a is connected to one end of an inner groove 92c of the nut 92, and the other end portion of the return pipe 92a is connected to the other end of the inner groove 92c of the nut 92. The ball 55 that rolls along a helical path between the outer groove 51a of the screw shaft 51 and the inner groove 92c of the nut 92 is scooped up at the one end portion of the return pipe 92a, passes the return pipe 92a, and then is returned again to the path from the other end portion of the return pipe 92a. Similarly, a flat portion 93b is also formed on the nut 93, and the return pipe 93a is mounted on the flat portion 93b.

The present invention is not limited to the realization of the embodiments, and can be modified into other embodiments within the scope that does not change the gist of the present invention.

In the third to fifth embodiments, the axial hole is a through-hole, and the perpendicular hole is a through-hole. However, they can also be formed as a hole that does not penetrate, that is, a bottomed hole.

In the third embodiment, the sensitive portion of the force sensor includes the first sensitive portion that detects an axial force, and the second sensitive portion that detects a circumferential force. However, it can also be configured in such a manner that the sensitive portion of the force sensor includes only the first sensitive portion that detects an axial force and a force sensor that detects a circumferential force is provided on another flat surface.

In the third embodiment, the shim is provided with the axial holes and, in the fourth embodiment, the shim is provided with the perpendicular holes. However, they can be used in combination.

First Example

An FEM analysis was carried out on the stresses that acted on the nuts 2 and 3 and the shim 4 when a compression force was applied, using the nuts 2 and 3 illustrated in FIG. 1. The results of the FEM analysis are illustrated in FIG. 7.

Figure 7C:
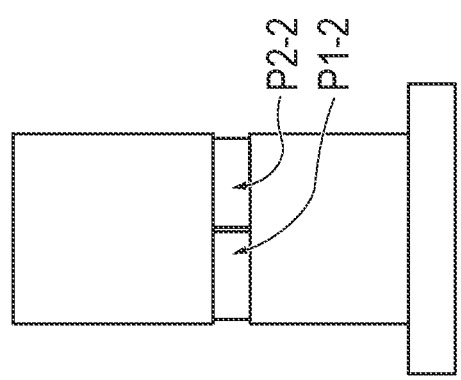
FIG. 7 is a diagram illustrating results of an FEM analysis.
Figure 7B:
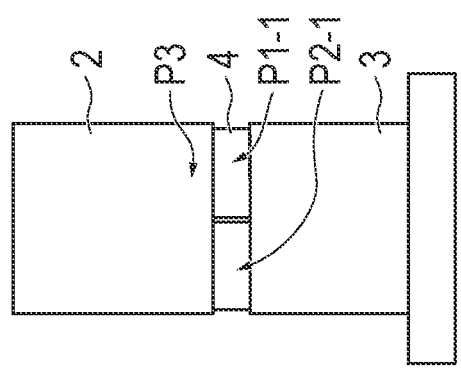
Figure 7A:
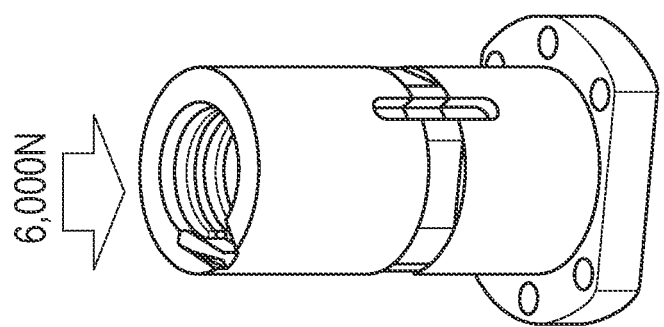

As illustrated in FIG. 7A, the compression force is 6000 N. As illustrated in FIG. 7B, places where high stress occurred were the outer surface of the shim 4 near the recesses 12 and 17 (refer to FIG. 1) of the nuts 2 and 3, that is, the flat surfaces P1-1 and P2-1. The recesses 12 and 17 are provided to the two nuts 2 and 3, respectively. Accordingly, the number of places where high stress occurred were two. It can be seen that if the force sensor 31 is attached to one of the flat surfaces P1-1 and P2-1 in two places, the output of the force sensor 31 can be increased. High stress also occurred near the recess 12 on an outer surface P3 of the nut 2. It was found that the attachment of the force sensor 31 in this place also allows the output of the force sensor 31 to increase. FIG. 7C illustrates a state where FIG. 7B is rotated 180 degrees about the axis. It can be seen that high stress does not occur on the outer surface of the shim 4 away from the recesses 12 and 17, that is, the flat surfaces P1-2 and P2-2.

Figure 8:
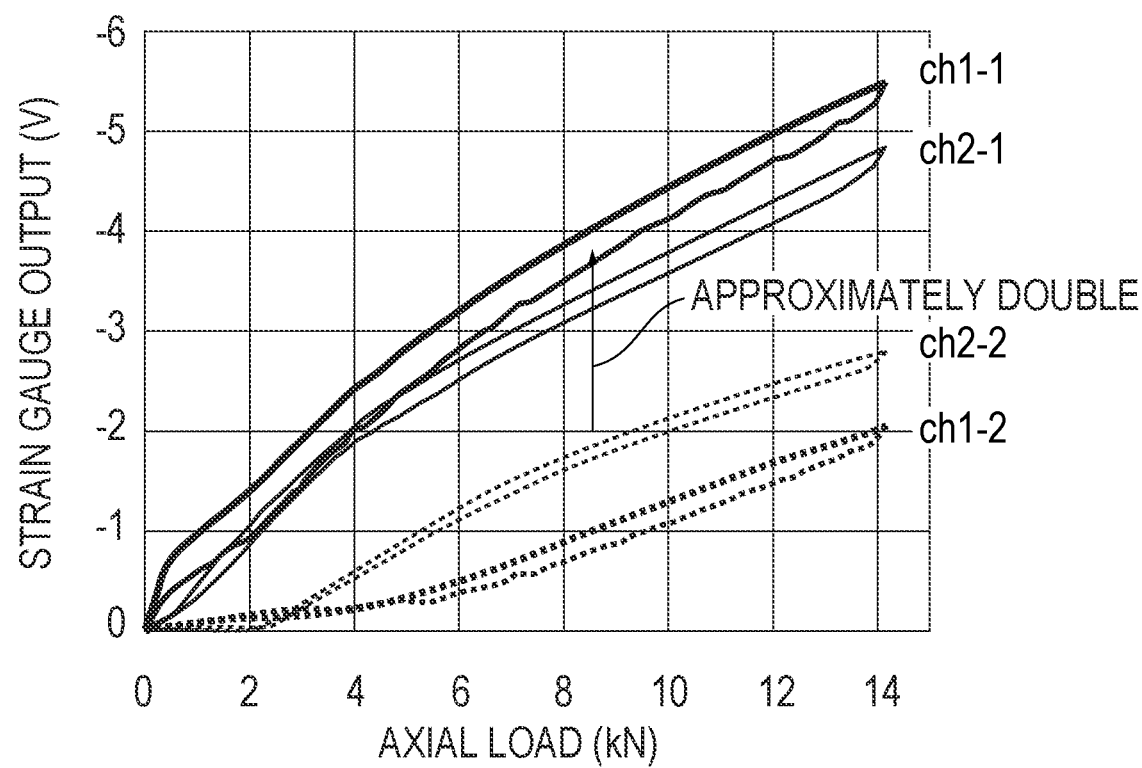
FIG. 8 is a graph illustrating test results.

FIG. 8 illustrates test results of when strain gauges were attached as the force sensors 31 to the shim 4. ch1-1 and ch2-1 indicate the outputs of the strain gauges of when the strain gauges were attached to the flat surfaces P1-1 and P2-1 in two places. ch1-2 and ch2-2 indicate the outputs of when the strain gauges were attached to the flat surfaces P1-2 and P2-2 in two places. The horizontal axis of FIG. 8 is the axial load (kN) applied to the two nuts, and the vertical axis of FIG. 8 is the output (V) of the strain gauge. The attachment of the strain gauges to the flat surfaces P1-1 and P2-1 allows increasing the output of the strain gauge to approximately double as compared to the case where the strain gauges were attached to the flat surfaces P1-2 and P2-2. That the output of the strain gauge is minus indicates compressive strain.

Second Example

An FEM analysis was carried out on the stresses that acted on the shims 54 and 83 when a compression force of 6000 N was applied, using the nuts 52 and 53 and the shim 54, which are illustrated in FIG. 9, and the shim 83 illustrated in FIG. 15. The results of the FEM analysis are illustrated in FIG. 18.

Figure 18A:
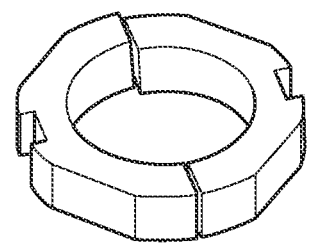
FIG. 18 is a diagram illustrating results of an FEM analysis.
Figure 18B:
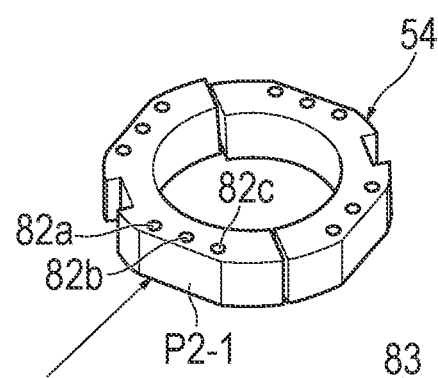
Figure 18C:
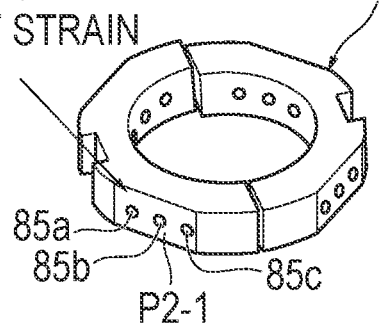

FIG. 18A is a previously-known example where the shim was not provided with holes. FIG. 18B is an invention example (1) (the shim 54 of the third embodiment) where the shim 54 was provided with the axial holes 82a, 82b, and 82c. FIG. 18C is an invention example (2) (the shim 83 of the fourth embodiment) where the shim 83 was provided with the perpendicular holes 85a, 85b, and 85c.

As illustrated in FIG. 18B, in the invention example (1), it was found that the compressive strain increased substantially across the area where the axial holes 82a, 82b, and 82c existed below the flat surface P2-1 of the shim 54. It can be seen that the attachment of the force sensor 81 to the flat surface P2-1 allows the output of the force sensor 81 to increase. As illustrated in FIG. 18C, in the invention example (2), high compressive strain occurred between the holes 85a and 85b and between the holes 85b and 85c. It can be seen that the attachment of the force sensors 86a and 86b at these positions allows the outputs of the force sensors 86a and 86b to increase.

Figure 19:
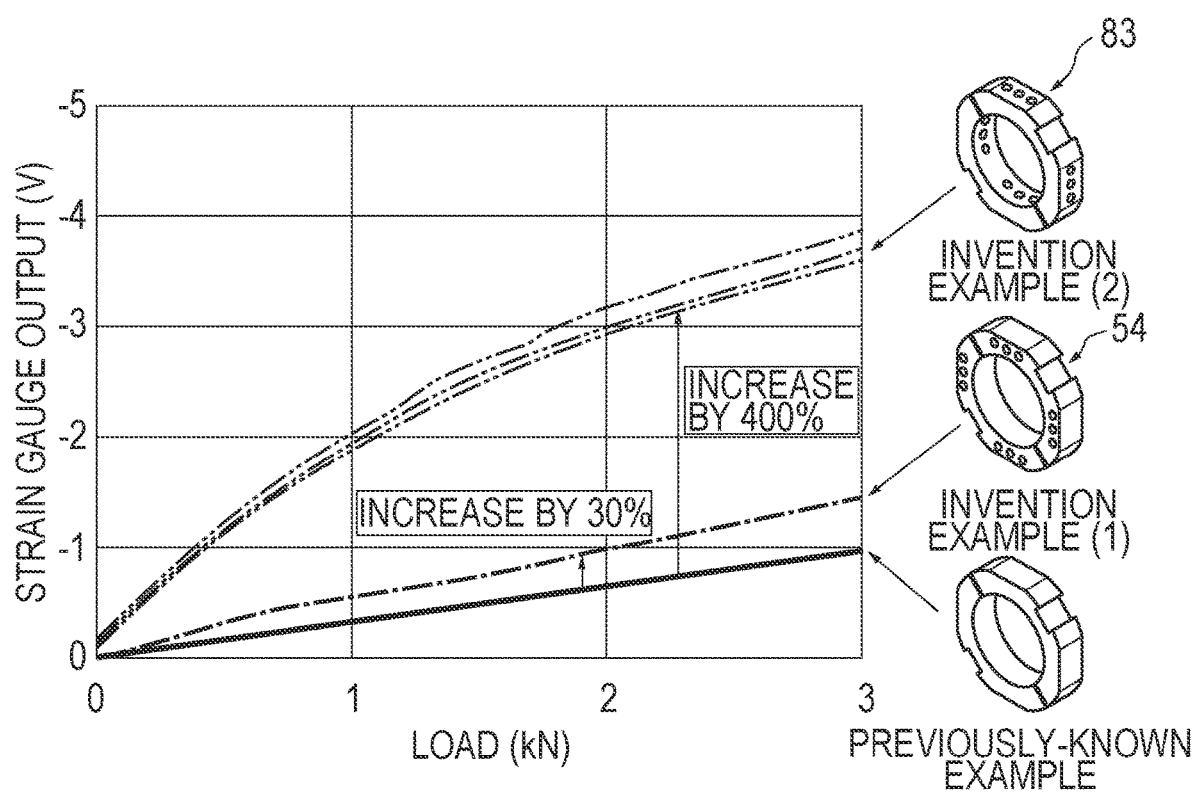
FIG. 19 is a graph illustrating test results.

FIG. 19 illustrates test results of when strain gauges were attached as the force sensors 81, 86a, and 86b to the shims 54 and 83. The horizontal axis of FIG. 19 is the axial load (kN) applied to the nuts 52 and 53. The vertical axis of FIG. 19 is the output (V) of the strain gauge. In the invention example (1), the output of the strain gauge could be increased by approximately 30% as compared to the previously-known example. In the invention example (2), the output of the strain gauge could be increased by approximately 400% as compared to the previously-known example.

The description is based on Japanese Patent Application No. 2017-202681 filed on Oct. 19, 2017 and Japanese Patent Application No. 2017-202682 filed on Oct. 19, 2017, the entire contents of which are included herein.

REFERENCE SIGNS LIST

1 Screw shaft
1a Outer groove
2, 3, 42, 43 Nut
2a, 3a Inner groove
4 Shim
4a, 4b Split shim
5, 6 Ball (rolling element)
9a, 9b Circulation portion
12 Recess
11, 44 Contact surface
12, 45 Recess
25, 26 Key (coupling portion)
27 Keyway
31 Force sensor
31a First sensitive portion (sensitive portion)
31b Second sensitive portion (sensitive portion)
P1-1 Flat surface (outer surface of the shim)
θ1 First fan-shaped virtual area
θ2 Second fan-shaped virtual area
51 Screw shaft
51a Outer groove
52, 53, 92, 93 Nut
52a, 53a, 92c Inner groove
54, 83 Shim
54a, 54b, 83a, 83b Split shim
55, 56 Ball (rolling element)

75, 76 Key (coupling portion)
81, 86a, 86b Force sensor
81a First sensitive portion (sensitive portion)
81b Second sensitive portion (sensitive portion)
82a, 82b, 82c Axial hole
85a, 85b, 85c Perpendicular hole
P2-1 Flat surface of the shim (outer surface of the shim)
W1 Breadth of the sensitive portion of the force sensor
W2 Breadth of the area of a plurality of holes

The invention claimed is:

1. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
a contact surface of at least one of the two nuts with the shim, and/or a contact surface of the shim with at least one of the two nuts, is provided with a recess, spaced apart from the coupling portion, in such a manner as to reduce the contact area,
the force sensor is attached near the recess on an outer surface of the shim and/or an outer surface of at least one of the two nuts, and
when the force sensor is attached to the outer surface of at least one of the two nuts, the force sensor is attached on the shim side with respect to a helical path in which the rolling elements are arranged, between the outer groove of the screw shaft and the inner groove of the nut.

2. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
a contact surface of at least one of the two nuts with the shim, and/or a contact surface of the shim with at least one of the two nuts, is provided with a recess, spaced apart from the coupling portion, in such a manner as to reduce the contact area,
the force sensor is attached near the recess on an outer surface of the shim and/or an outer surface of at least one of the two nuts, and
as viewed in an axial direction of the nut, a first fan-shaped virtual area of the nut delimited by a sensitive portion of the force sensor is included in a second fan-shaped virtual area of the nut delimited by the recess.

3. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
a contact surface of at least one of the two nuts with the shim is provided with a recess, spaced apart from the coupling portion, in such a manner as to reduce the contact area,
the force sensor is attached near the recess on an outer surface of the shim, and
an outside diameter of the shim is less than an outside diameter of the two nuts.

4. The preload detectable screw device according to claim 1, wherein a circulation portion for circulating the rolling elements is inserted into the recess.

5. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
a contact surface of at least one of the two nuts with the shim, and/or a contact surface of the shim with at least one of the two nuts, is provided with a recess, spaced apart from the coupling portion, in such a manner as to reduce the contact area,
the force sensor is attached near the recess on an outer surface of the shim and/or an outer surface of at least one of the two nuts,
the shim includes a pair of arc-shaped split shims, and
a pair of keyways where a pair of keys as the coupling portions are fitted is formed in the pair of split shims.

6. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
a contact surface of at least one of the two nuts with the shim, and/or a contact surface of the shim with at least one of the two nuts, is provided with a recess, spaced apart from the coupling portion, in such a manner as to reduce the contact area, the force sensor is attached near the recess on an outer surface of the shim and/or an outer surface of at least one of the two nuts, and the force sensor includes:
- a first sensitive portion configured to detect an axial force on the shim and/or the nut, and
- a second sensitive portion configured to detect a circumferential force on the shim and/or the nut.

7. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
the shim is provided with at least one hole, spaced apart from the coupling portion,
the force sensor is attached near the hole on an outer surface of the shim, and
the force sensor is placed outside the hole.

8. The preload detectable screw device according to claim 7, wherein the hole comprises at least one axial hole extending in an axial direction of the shim.

9. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
the shim is provided with at least one hole, spaced apart from the coupling portion,
the force sensor is attached near the hole on an outer surface of the shim,
the hole comprises at least one axial hole extending in an axial direction of the shim, and
as viewed in the axial direction of the shim, a breadth of a sensitive portion of the force sensor is less than a breadth of an area of the plurality of holes behind the force sensor.

10. The preload detectable screw device according to claim 7, wherein the hole comprises at least one perpendicular hole extending in a direction perpendicular to a flat surface of the shim where the force sensor is attached.

11. The preload detectable screw device according to claim 10, wherein the force sensor is attached, adjacent to the hole in a circumferential direction of the shim, at substantially the same position as the hole in the axial direction of the shim.

12. A preload detectable screw device, comprising:
a screw shaft including a helical outer groove;
two nuts assembled to the screw shaft, the two nuts including a helical inner groove facing the outer groove;
a plurality of rolling elements disposed between the outer groove of the screw shaft and the inner groove of each of the two nuts;
a shim sandwiched and compressed between the two nuts;
a coupling portion configured to couple the two nuts in such a manner as to be incapable of relative rotation to each other; and
a force sensor for detecting preload,
wherein:
the shim is provided with at least one hole, spaced apart from the coupling portion,
the force sensor is attached near the hole on an outer surface of the shim,
the shim includes a pair of arc-shaped split shims, and
each of the pair of split shims is provided with the hole.

13. The preload detectable screw device according to claim 2, wherein
the force sensor is attached to the outer surface of the shim,
the contact surface of at least one of the two nuts with the shim is provided with the recess, and
an outside diameter of the shim is less than an outside diameter of the two nuts.

14. The preload detectable screw device according to claim 2, wherein a circulation portion for circulating the rolling elements is inserted into the recess.

15. The preload detectable screw device according to claim 3, wherein a circulation portion for circulating the rolling elements is inserted into the recess.

16. The preload detectable screw device according to claim 2, wherein
the shim includes a pair of arc-shaped split shims, and
a pair of keyways where a pair of keys as the coupling portions are fitted is formed in the pair of split shims.

17. The preload detectable screw device according to claim 3, wherein
the shim includes a pair of arc-shaped split shims, and
a pair of keyways where a pair of keys as the coupling portions are fitted is formed in the pair of split shims.

18. The preload detectable screw device according to claim 4, wherein
the shim includes a pair of arc-shaped split shims, and
a pair of keyways where a pair of keys as the coupling portions are fitted is formed in the pair of split shims.

19. The preload detectable screw device according to claim 2, wherein the force sensor includes:
a first sensitive portion configured to detect an axial force on the shim and/or the nut; and
a second sensitive portion configured to detect a circumferential force on the shim and/or the nut.

20. The preload detectable screw device according to claim 3, wherein the force sensor includes:
a first sensitive portion configured to detect an axial force on the shim and/or the nut; and
a second sensitive portion configured to detect a circumferential force on the shim and/or the nut.

* * * * *